United States Patent

Itoh et al.

[11] Patent Number: 5,946,122
[45] Date of Patent: Aug. 31, 1999

[54] ROTATING DEVICE AND LIGHT BEAM DEFLECTING APPARATUS

[75] Inventors: Masao Itoh; Satoshi Shibuya; Naoji Kamimura, all of Hachioji, Japan

[73] Assignee: Konica Corporation, Japan

[21] Appl. No.: 08/840,671

[22] Filed: Apr. 29, 1997

[30] Foreign Application Priority Data

May 9, 1996 [JP] Japan ................................. 8-114756

[51] Int. Cl.⁶ .................................................. G02B 26/08
[52] U.S. Cl. ........................... 359/200; 359/198; 310/46; 310/262; 384/107; 384/112
[58] Field of Search .................... 359/198, 200; 310/40 R, 46, 262; 384/107, 112

[56] References Cited

U.S. PATENT DOCUMENTS

| | | |
|---|---|---|
| 4,958,098 | 9/1990 | Sarraf . |
| 4,984,881 | 1/1991 | Osada et al. ........................... 359/198 |
| 5,114,245 | 5/1992 | Tanaka et al. . |

FOREIGN PATENT DOCUMENTS

| | | |
|---|---|---|
| 0433483 | 6/1991 | European Pat. Off. . |
| 0558092 | 9/1993 | European Pat. Off. . |
| 19510593 | 9/1995 | European Pat. Off. . |

OTHER PUBLICATIONS

Search Report EP 97 10 7123.

*Primary Examiner*—Thong Nguyen
*Assistant Examiner*—Darren E. Schuberg
*Attorney, Agent, or Firm*—Jordan B. Bierman; Bierman, Mauserlin and Luscas

[57] ABSTRACT

In a rotating device which comprises a rotor; a radial bearing; a lower thrust bearing; a dynamic pressure generating means, a radial bearing area (mm²) which is the area of the rotor facing the radial bearing, a thrust bearing area (mm²) which is the area of the rotor facing the lower thrust bearing, and the rotor weight (g) are determined so as to satisfy the following formula:

(a radial bearing area)/(thrust bearing area)×(rotor weight)<300.

8 Claims, 4 Drawing Sheets

ROTATING DEVICE AND LIGHT BEAM DEFLECTING APPARATUS

BACKGROUND OF THE INVENTION

The present invention relates to a rotating device provided with a dynamic pressure bearing in which a space is formed between a rotor and a lower thrust bearing and between the rotor and a radial bearing by the action of a dynamic pressure generating groove with rotation of the rotor. Further, the present invention relates to a light beam deflecting apparatus using the rotating device.

In comparison with conventional rotating devices using ball bearings, a rotating device using a dynamic pressure bearing is superior in that it makes extremely high speed rotation possible. As a result, recently, further development has been conducted for it. Generally, the rotating device using the dynamic pressure bearing is composed of upper and lower thrust bearings, a radial bearing, and a rotor rotatable on the radial bearing. With the rotation of the rotor, an air gap of several microns is formed between the rotor and the bearings by the action of dynamic pressure generating grooves provided on each of the bearings, thereby reducing the resistance between the rotor and the bearings. As a result, it allows the rotor to rotate at very high speeds. In such rotating device using the dynamic pressure bearing, since it is necessary to maintain the air gap of several microns between the rotor and the bearings, it is requested for the rotor to be extremely well balanced so as to have high grade balance. Taking an example of a rotor rotating in 20,000 rpm, its balance grade has to be not lower than G1 grade as defined in JIS BO905-1978. If its balance grade is G2 grade, vibration on the rotor become excessive. The vibration affects not only the accuracy of light beam deflection, but also causes galling and burning.

Further, ambient temperature surrounding the rotor is raised by heat generated from a motor coil during rotation of the rotor. Especially, in the case that a rotor is rotated in 20,000 rpm or more in a light beam deflecting device to deflect a laser beam in an image forming apparatus, the ambient temperature rise becomes approximate 40° C. and a temperature of the rotor is also raised. Since the rotating device using the dynamic pressure bearing is required the high grade balance as discussed above, if the temperature is raised, the rotor becomes unbalance, resulting in galling and burning so that a required performance of the rotating device may not be achieved. For example, if the ambient temperature rise becomes 40 degrees, the balance grade may happen to lower from G1 grade to G2 grade, increasing vibration to an extent of ten times heavier. As a result, in the light beam deflecting device, the deflected light beam is so deviated that high quality image can not be formed.

As factors which cause the unbalance of the rotor due to temperature change, thermal expansion in the structural material of the rotor, thermal expansion in plural structural members when the rotor is composed of the plural structural members, influence of adhesive to joint the plural structural members may be listed, and they are considered to cause various thermal expansions differing in extent or location in the rotor.

Then, the objective of the present invention is to provide a rotating device or a light deflecting apparatus comprising a dynamic bearing with a structure which causes less balance fluctuation and is resistant to balance fluctuation even when the balance degree of the rotor becomes poor due to various causes, The above objective can be attained by the following structures of the present invention.

In a rotating device provided with a dynamic pressure bearing in which a space is formed between a rotor and a lower thrust bearing and between the rotor and a radial bearing by an action of dynamic pressure generating grooves with rotation of the rotor, the rotating device satisfies the following formula:

(a radial bearing area)/(thrust bearing area)×(rotor weight)<300 wherein the radial bearing area ($mm^2$) is an area of the rotor facing the radial bearing, the thrust bearing area ($mm^2$) is an area of the rotor facing the lower thrust bearing, and the rotor weight (g) is the weight of the rotor.

In the above rotating device, on an upper section of the radial bearing is provided a preventing means for preventing the rotor from slipping out.

In the above rotating device, on the thrust bearing is formed a dynamic pressure generating groove.

In the above rotating device, on a lower section of the rotor is provided a magnet, and on a position facing the magnet is provided a coil so that the rotor is rotated together with the magnet by switching on an electric circuit for the coil.

In the above rotating device, on the rotor is provided a polygonal mirror.

DETAILED DESCRIPTION OF THE PREFERRED EMBODIMENT

Figure 1:
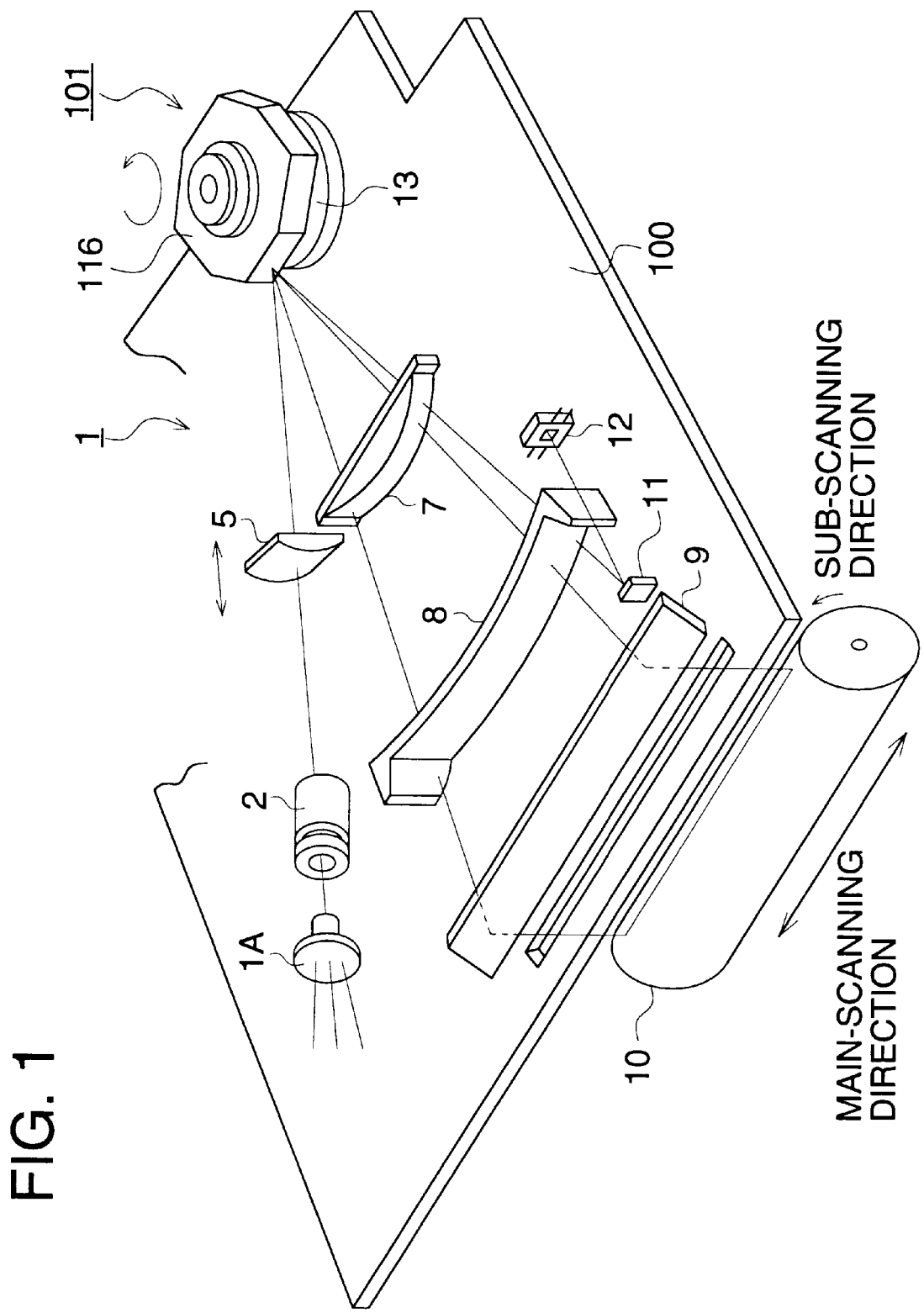
FIG. 1 is a perspective view showing a unit of a light beam scanning optical system in which a rotating device provided with a dynamic pressure bearing is used as a light beam deflecting device.

FIG. 1 is a perspective view showing an embodiment of a unit of an optical light beam scanning system in which a rotating device provided with a dynamic pressure bearing is used as a light beam deflecting device.

In FIG. 1, reference numeral 100 is a base on which a rotating device is mounted, 2 is a collimator (a optical system for correcting a shape of a beam), 5 is a cylindrical lens, 116 is a polygonal mirror, 7 is a fθ lens, 8 is a second cylindrical lens, 9 is a reflecting mirror, 10 is a photoreceptor drum. Further, 11 is a timing detecting mirror, 12 is a synchronization detecting means, 13 is a driving motor for the polygonal mirror 116. A beam emitted from a semiconductor type laser emitting device 1A is shaped in parallel light beam by the collimator 2. The beam is brought through the first cylindrical lens to incidence on the rotating polygonal mirror and then is reflected from it. The reflected beam passes through the second image forming optical system composed of the fθ lens 7 and the second cylindrical lens 8 and passes through the reflecting mirror 9 so as to scan in the form of a spot of a predetermined diameter in the main scanning direction on the photoreceptor drum 10. Incidentally, the synchronization detection for each scanning line is conducted by bringing the beam through the mirror 11 to incident on the synchronization detector 12 before starting the main scanning.

Figure 2:
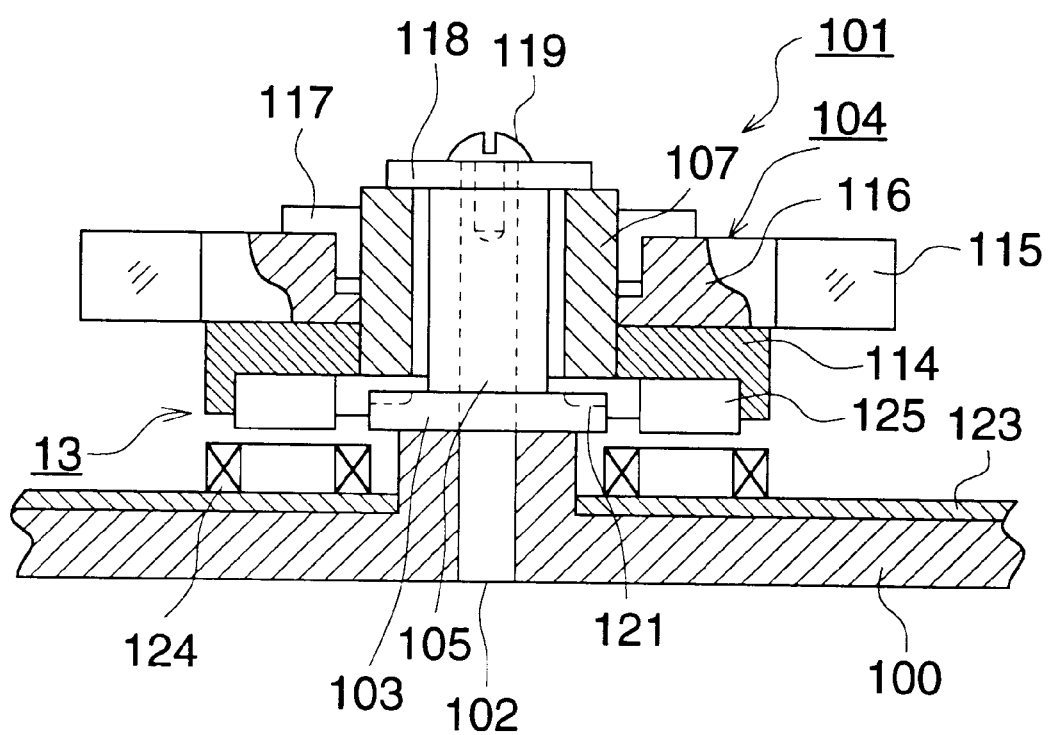
FIG. 2 is sectional view showing a entire construction of a rotating device 101 provided with a dynamic pressure device.

FIG. 2 is an enlarged view of the rotating device shown in FIG. 1 and is a sectional view showing the entire construction of a rotating device 101 provided with a dynamic pressure device.

The rotating device 101 comprises a lower thrust bearing 103, a radial bearing 105, a retaining sheet plate 118 used as the preventing means for preventing the rotor from slipping out, a screw 119 and the rotor 104. The lower thrust bearing is provided with a dynamic pressure bearing.

On the base 100 is fixed vertically a core shaft 102 for supporting the rotating device 101. A disk-shaped lower thrust bearing 103 made of a ceramic material and a cylindrical radial bearing 105 are fitted around the core shaft 102 and are mounted in such order on the base 100. With the retaining sheet plate 118 used as the slipping-out preventing means and the screw 119, the lower thrust bearing 103 and the radial bearing 105 are fixed on the base 100. Incidentally, the lower thrust bearing 103 and the radial bearing 105 may be made in one body.

Further, the rotor 104 is fitted around the radial bearing 105 and is located between the retaining sheet plate 118 and the lower thrust bearing 103 in such a manner that the rotor 104 is rotatable around the radial bearing 105. Each of the radial bearing 105 and a rotor core 107 are subjected to a high precision surface treatment so that a gap of 1 to 7 $\mu$m is formed between the radial bearing 105 and the rotor core 107.

A support section 114 is fixed on the outer periphery of the rotor core 107 and the polygonal mirror 116 on which plural reflecting mirror surfaces 115 are formed is fixed on the support section 114 with a fixing member 117, thereby forming the rotor unit 104 rotatable in one body around the radial bearing 105.

In the present invention, the rotor 104 means all members actually rotating as one body. In this embodiment, the rotor 104 comprises the rotor core 107, the support section 117, the polygonal mirror 116 on which plural reflecting mirror surfaces 115, the fixing member 117 and magnet 125 which is mentioned later on.

In this embodiment, as the slipping-out preventing means, the retaining sheet plate 118 and the screw 119 are used without using the upper thrust bearing. The reason is to provide a function to fix the lower thrust bearing 103 and the radial bearing 105 in addition to the function to prevent the slipping-out. Since the retaining sheet plate 118 and the screw 119 do not need manufacturing precision and achieve the above two functions, the number of machinery parts can be reduced and the device can be made at lower cost. Needless to say, it may be possible to provide the upper thrust bearing between the retaining sheet plate 118 and the radial bearing 105.

The dynamic pressure generating groove is provided not only on the lower thrust bearing, but also can be provided on the upper thrust bearing. However, as demonstrated in the this embodiment, in the case that the dynamic pressure generating groove 121 is formed only on the lower thrust bearing 103, the rotation precision is not affected. Since the dynamic pressure generating groove 121 is not required to be formed on the upper thrust bearing, the number of processes to form the dynamic pressure generating groove can be reduced and the device can be manufactured at lower cost.

As a driving source to rotate the rotor 104, an axial type driving motor 13 is used. For this driving motor 13, a stator coil 124 is provided together with an insulating material 123 on the base 100 and magnets 125 are provided at a position facing the stator coil 124 on a lower section of the supporting section 114 of the rotor 104. When the stator coil 124 is activated, the rotation of the rotor 104 is induced. Subsequently, under the rotation of the rotor 104, an air gap is formed between the rotor 104 and the lower thrust bearing 103 and between the rotor 104 and the radial bearing 105 by the action of dynamic pressure generated by the dynamic pressure generating grooves 121 formed on the lower thrust bearing 103, whereby the polygonal mirror 116 can be smoothly rotated at a high speed. The rotating device 101 of the present invention is constructed as explained above and make it possible to attain extremely high speed operation.

Now, an inventive example of the present invention and a comparative example will be explained.

Figure 3:
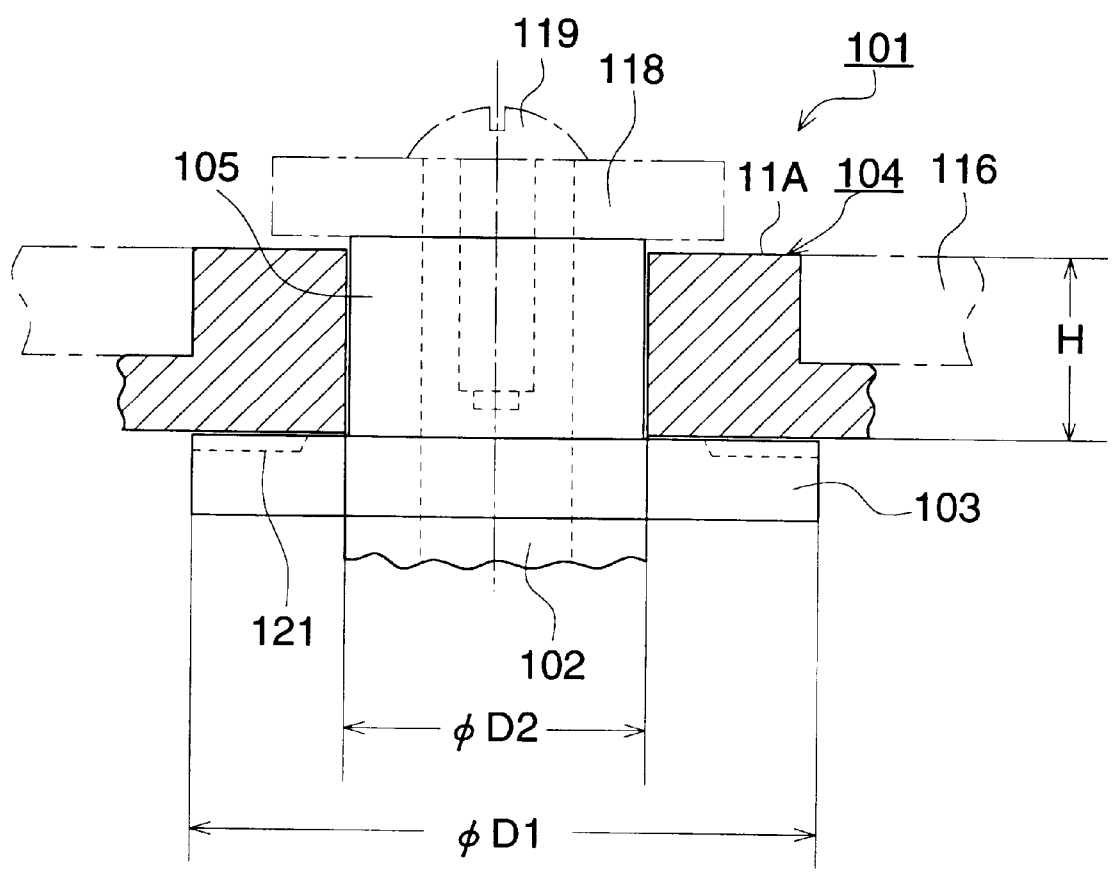
FIG. 3 is an enlarged sectional view showing the dynamic pressure bearing and a part of the rotor in the rotating device of FIG. 2.

In FIG. 3 in which a part of the rotor corresponding in position to the dynamic pressure bearing of the rotating device 101 shown in FIG. 2 is enlarged, test devices were prepared by varying the diameter D1 (mm) of the thrust bearing, the inside diameter D2 (mm) of the rotor, the height H (mm) of the rotor, the weight W(g) of the rotor as shown in Table 1 and anti-unbalance capability test (balance retaining capability test) was conducted on the test devices.

TABLE 1

| | H(mm) | D1(mm) | D2(mm) | W(g) | Index | Anti-unbalance capability |
|---|---|---|---|---|---|---|
| Inventive Example 1 | 6 | 19 | 10 | 20 | 18 | A |
| Inventive Example 2 | 6 | 19 | 10 | 25 | 23 | A |
| Inventive Example 3 | 10 | 22 | 10 | 35 | 36 | A |
| Inventive Example 4 | 15 | 22 | 10 | 40 | 63 | B |
| Inventive Example 5 | 6 | 19 | 10 | 120 | 110 | C |
| Inventive Example 6 | 15 | 19 | 10 | 50 | 115 | C |
| Inventive Example 7 | 16 | 22 | 16 | 38 | 171 | C |
| Inventive Example 8 | 15 | 22 | 10 | 100 | 156 | C |
| Inventive Example 9 | 15 | 22 | 10 | 160 | 250 | C |
| Comparative Example 1 | 16 | 19 | 16 | 38 | 371 | D |
| Comparative Example 2 | 16 | 26 | 16 | 180 | 439 | D |
| Comparative Example 3 | 16 | 26 | 16 | 200 | 488 | D |

In this test, occurrence of burning in each test device was observed while ambient temperature surrounding the test devices was changed. In Table 1, in an example indicated with A in anti-unbalance capability, burning was not observed in the test device of the example even when the ambient temperature change exceeded over 50° C. In examples indicated with B, burning was not observed in the test device of the examples even when the ambient temperature change exceeded over 40° C. In examples indicated with C, burning was not observed in the test device of the examples even when the ambient temperature change exceeded over 30 ° C. In examples indicated with D, burning was observed in the test device of the examples before the ambient temperature change exceeded over 30° C.

In Table 1, Index is calculated by the following formula:

Index=(a radial bearing area)/(thrust bearing area)×(rotor weight)

wherein the radial bearing area (mm$^2$) is the area of the rotor 104 facing the radial bearing 105, the thrust bearing area ($mm^2$) is the area of the rotor 104 facing the lower thrust bearing 103, and the rotor weight (g) is the weight of the rotor 104.

More concretely explaining with reference to FIG. 3, since (a radial bearing area), (thrust bearing area), and (thrust bearing area) are represented as follows, (a radial bearing area)=$\pi \times D2 \times H$ ($mm^2$), (thrust bearing area)=$\pi \times (D1^2-D2^2)/4$ ($mm^2$), (rotor weight)=$W(g)$ Index can be obtained by the following formula:

$$\text{Index}=(\pi \times D2 \times H)/(\pi \times (D1^2-D2^2)/4) \times W$$

As can be seen from the test results of Inventive Examples and Comparative Examples indicated in Table 1, in the case that Index is not larger than 300, the test device became tough against balance fluctuation caused by the ambient temperature change. It is preferable that Index is not larger than 100. It is more preferable that Index is not larger than 50.

Incidentally, during manufacture of the rotating device, while the rotation speed of the rotating device is increased stepwise, balance adjustment is conducted for each step. Finally, it is necessary to conduct the balance adjustment at a normal rotation. Because, since at the initial manufacturing stage of the rotating device, a rotor may be unbalanced, it may be impossible to directly increase the rotation speed of the rotating device to the normal rotation speed. Accordingly, in conventional rotating devices, after the balance adjustment is conducted several times at reduced rotation speeds, the final balance adjustment is conducted at the normal rotation speed.

Then, while conducting the balance adjustment for the test devices of Inventive Examples and Comparative Examples in Table 1 during the manufacturing stage, an initial rotation speed at which no contact or no galling was observed was investigated. In the test devices of the examples marked with "A" in anti-unbalance capability, no galling was observed up to about 16,000 rpm. In the test devices of the examples marked with "B", no galling was observed up to about 12,000 rpm. In the test devices of the examples marked with "C", no galling was observed up to about 8,000 rpm. However, in the test devices of the examples marked with "C", galling was observed at a lower rotation speed than 8,000 rpm.

Therefore, by satisfying the index defined by the present invention, since the initial rotation speed at which the balance adjustment is initially conducted becomes high, the number of the balance adjustment conducted while increasing a rotation speed stepwise to the normal rotation speed can be reduced. As a result, as accompanying effects, manufacturing cost can be greatly reduced and a manufacturing time period can also be greatly shortened.

Figure 4:
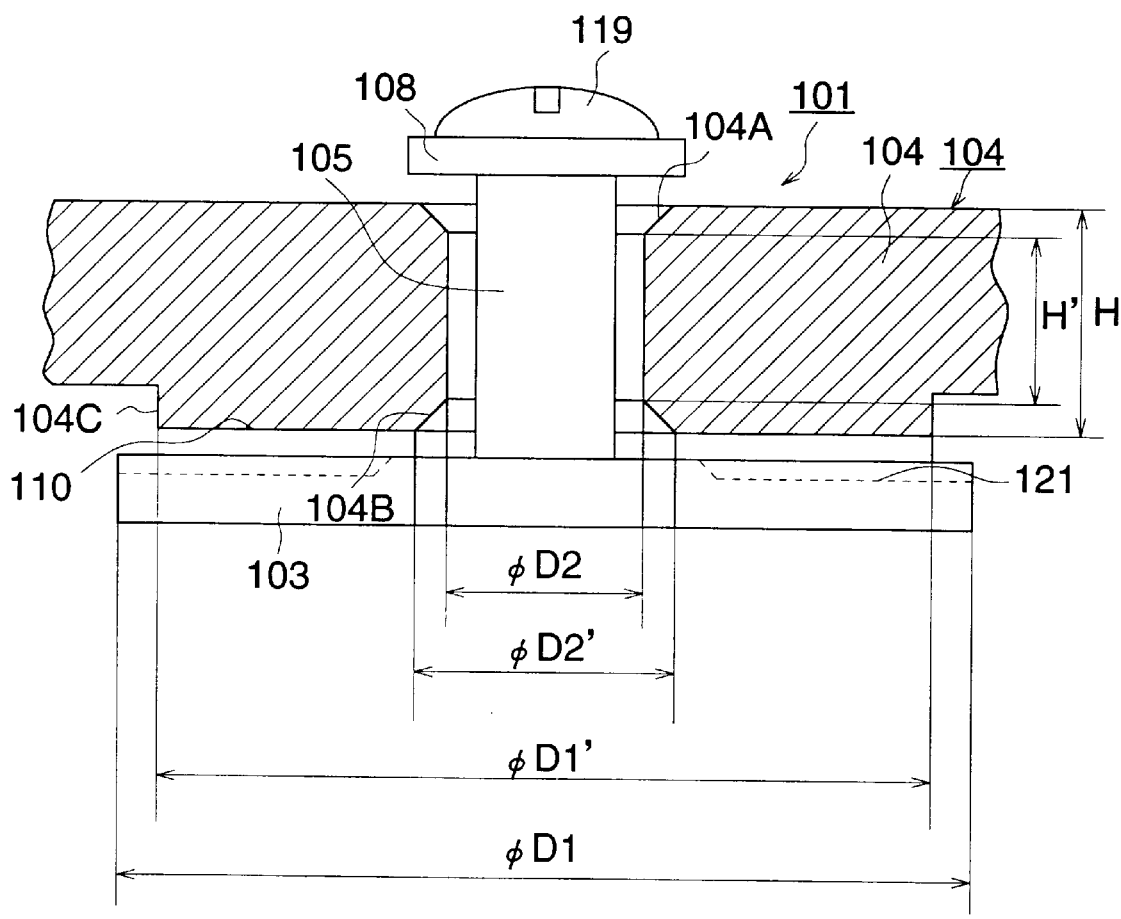
FIG. 4 is a sectional view showing a structure of another example of a rotating device.

Incidentally, not only the shape of the rotor 104 shown in FIG. 3, with a shape shown in FIG. 4, the same test result as stated above may be obtained.

In the rotor 104 shown in FIG. 4, chamfering is applied on corners 104A, 104B of the surfaces of the rotor 104 facing the radial bearing 105, and cut-out portion 104 is provided on the outside of the surface of the rotor 104 facing the lower thrust bearing 103.

In this case, since the radial bearing surface ($mm^2$) is the area of the surface of the rotor 104 facing the radial bearing 105, the radial bearing surface is represented in FIG. 4 as (radial bearing area)=$\pi \times D2 \times H'$ ($mm^2$). In the case that the chamfering is not applied on corners 104A, 104B as same as in FIG. 3, since H'=H, the radial bearing surface is represented as (radial bearing area)=$\pi \times D2 \times H$ ($mm^2$) Incidentally, if the width applied with the chamfering is not larger than 0.5 mm, the chamfering is deemed as not being applied, H' is deemed as being equal to H. Further, if the surface of the rotor 104 facing the radial bearing 105 is slanted in positional relation to the surface of the radial bearing 105, when the width of the slant in the radial direction is not larger than several millimeters, the slant is negligible and the average inner diameter of the slanted rotor is used as D2.

Also, since the thrust bearing surface ($mm^2$) is the area of the surface of the rotor 104 facing the thrust bearing 105, the thrust bearing surface is represented in FIG. 4 as (a thrust bearing area)=$\pi \times (D1'^2-D2'^2)/4$ ($mm^2$). In the case that the chamfering and the cut-out portion are not applied as same as in FIG. 3, since D2'=D2, the thrust bearing surface is represented as (a thrust bearing area)=$\pi \times (D1^2-D2^2)/4$ ($mm^2$). If the width applied with the chamfering on the rotor 104 is not larger than 1 mm, the chamfering is deemed as not being applied, D2' is deemed as being equal to D2. If a width of the cut-out portion in the radial direction is not larger than several millimeters, the width of the cut-out portion is negligible and D1' is deemed as being equal to D1.

The rotor weight (g) is the weight of the rotor, that is, a total weight of actually rotating members. For example, in the case that the rotor 104 is provided with a magnet to rotate the rotor 104 and a polygonal mirror, the total weight includes a weight of the magnet and the polygonal mirror.

From the abovementioned points, in the case of the rotating device shown in FIG. 4, assuming that (rotor weight) is W(g), Index of the present invention calculated by (a radial bearing area)/(thrust bearing area)×(rotor weight) can be obtained by the following formula:

$$\text{Index}=(\pi \times D2 \times H)/(\pi \times (D1'^2-D2'^2)/4) \times W$$

In the rotating device shown in FIG. 4, by making Index calculated by (a radial bearing area)/(thrust bearing area)× (rotor weight) not larger than 300, the abovementioned effects can be obtained. It may be preferable that Index is not larger than 100. It may be more preferable that Index is not larger than 50.

In the present invention, in rotating devices provided with a dynamic pressure bearing in which a space is formed between a rotor and a lower thrust bearing and between the rotor and a radial bearing by action of dynamic pressure generating grooves with rotation of the rotor, by satisfying the following formula among the radial bearing area ($mm^2$) which is the area of the rotor 104 facing the radial bearing 105, the thrust bearing area ($mm^2$) which is the area of the rotor 104 facing the lower thrust bearing 103, and the rotor weight (g) which is the weight of the rotor 104, regardless of the shape of the rotor, (a radial bearing area)/(thrust bearing area)×(rotor weight)<300, even if unbalance takes place on the rotor 104 due to various factors, the present invention can provide a dynamic pressure bearing having a structure which causes less balance fluctuation and is resistant to balance fluctuation.

Further, on the upper portion of the radial bearing, since the above rotating device comprises the slipping-out preventing means which do not need a relatively high processing accuracy, the rotating device can be manufactured at low cost.

Since the dynamic pressure generating groove is provided only on the lower thrust bearing, the number of processes to make the pressure generating groove which needs relatively high processing accuracy can be reduced. As a result, the rotating device can be manufactured at lower cost.

Since magnets are provided on the lower section of the rotor and a coil is provided on a position facing the magnet, by switching on an electric circuit for the coil, the rotor can be easily rotated at a high speed.

When a laser beam is reflected on the polygonal mirror provided on the rotor, the reflected laser beam does not deviate.

What is claimed is:

1. A rotating device, comprising:

a rotor;

a radial bearing to regulate a rotation axis of the rotor;

a lower thrust bearing on which a part of the rotor rides so that a weight of the rotor is loaded on the lower thrust bearing;

a dynamic pressure generating means for generating a dynamic pressure with rotation of the rotor so that a gap is formed between the radial bearing and the rotor and between the lower thrust bearing and the rotor, wherein a radial bearing area (mm$^2$) which is an area of the rotor facing the radial bearing, a thrust bearing area (mm$^2$) which is an area of the rotor facing the lower thrust bearing, and the rotor weight (g) are determined so as to satisfy the following formula:

(a radial bearing area)/(thrust bearing area)×(rotor weight)<300.

2. The device of claim 1, wherein the formula is (a radial bearing area)/(thrust bearing area)×(rotor weight)<100.

3. The device of claim 2, wherein the formula is (a radial bearing area)/(thrust bearing area)×(rotor weight)<50.

4. The device of claim 1, further comprising slipping-out preventing means provided on an upper portion of the radial bearing, for preventing the rotor from slipping out of the radial bearing.

5. The device of claim 1, wherein the dynamic pressure generating means comprises a dynamic pressure generating groove provided only on the lower thrust bearing.

6. The device of claim 1, further comprising a magnet provided on a lower section of the rotor and a coil provided so as to face the magnet, wherein the rotor is rotated by switching on an electric circuit for the coil.

7. The device of claim 1, wherein the rotor is so constructed that a polygonal mirror is mounted on the rotor and the rotating device is used to deflect a laser beam.

8. The device of claim 1 wherein a gap between said rotor and said radial bearing is 1 $\mu$m to 7 $\mu$m.

* * * * *